Jan. 1, 1935.　　　　A. O. ABBOTT, JR　　　　1,986,092
TIRE SHAPING MACHINE
Filed June 11, 1931　　4 Sheets-Sheet 1

INVENTOR.
ADRIAN O. ABBOTT, JR.
BY
ATTORNEYS.

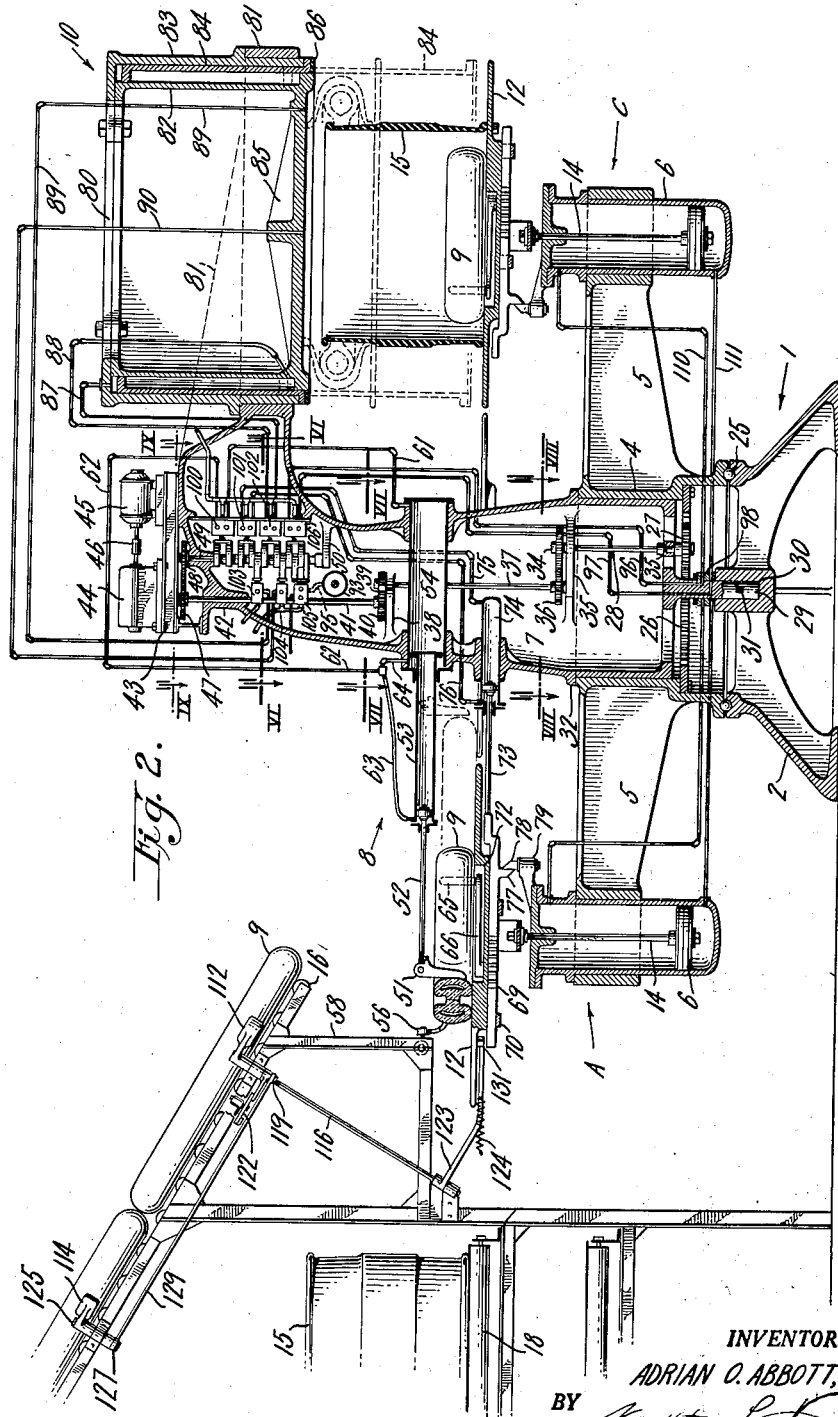

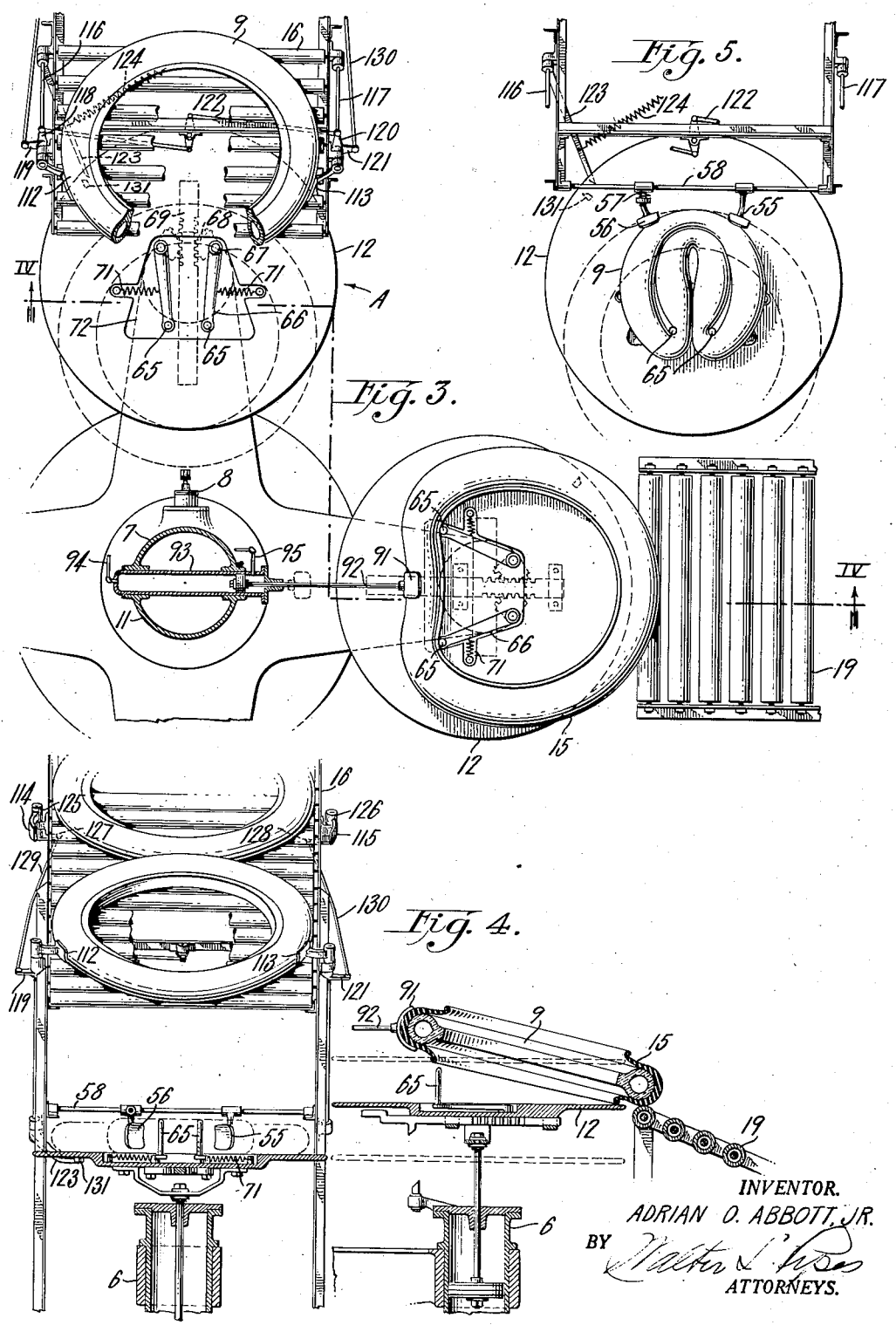

Jan. 1, 1935. A. O. ABBOTT, JR 1,986,092
TIRE SHAPING MACHINE
Filed June 11, 1931  4 Sheets-Sheet 4

INVENTOR.
ADRIAN O. ABBOTT, JR.
BY
ATTORNEYS.

Patented Jan. 1, 1935

1,986,092

UNITED STATES PATENT OFFICE 1,986,092

TIRE SHAPING MACHINE

Adrian O. Abbott, Jr., Grosse Pointe Park, Mich., assignor to Morgan & Wright, Detroit, Mich., a corporation of Michigan Application June 11, 1931, Serial No. 543,611

20 Claims. (Cl. 18—4)

My invention relates to tire shaping machines and more particularly to automatic tire expanding and bagging machines.

This invention relates to the general subject matter of and is an improvement over the subject matter of my prior Patent No. 1,961,727, June 5, 1934.

In the manufacture of automobile tires a method now in extensive use is that of forming each tire carcass in a cylindrical band or shape. The band is then subjected to differential pressure between its inner and outer faces for giving it a curved shape in cross section. The partially shaped tire is subsequently placed in a mold and subjected to pressure during a curing operation for causing the outer surface of the tire to take the impression of the mold configuration, whereby the tread design and other markings are impressed on the tire. Fluid tight curing bags must be inserted in such tires prior to their being placed in the molds. As such curing bags are relatively large and stiff, considerable muscular effort is required to buckle them and insert them into the partially shaped tires.

It has also been proposed to buckle or collapse such curing bags into machinery and introduce the collapsed bags into the tire bands. Many of these machines have required the transportation and handling of the tires, bags or assembled tires and bags between separate operations. Moreover, considerable handling has been required in supplying the tire forming elements to the machines.

I provide a machine for automatically supplying, buckling or collapsing and feeding curing bags into previously treated tire bands in a released condition. The tire bands are then shaped with the curing bags in place and are automatically ejected from the machine and conveyed to positions for placing them in the molds. The shaping operation is entirely automatic except for the placing of the bands into the machine by an operator, who also paints, dusts, or otherwise treats the bands before placing them in the machine.

The accompanying drawings illustrate a present preferred embodiment of the invention in which Figure 1 is a plan view of a machine embodying my invention;

Figure 2 is a section taken substantially along the line II—II of Fig. 1;

Figure 3 is a fragmentary plan view, partly in section, showing details of the mechanism for releasing and supplying the curing bags to the machine, and also of the mechanism for ejecting the shaped band from the machine;

Figure 4 is a section taken substantially along the line IV—IV of Fig. 3;

Figure 5 is a plan view of the curing bag when collapsed against the retaining shoes;

Figure 1:
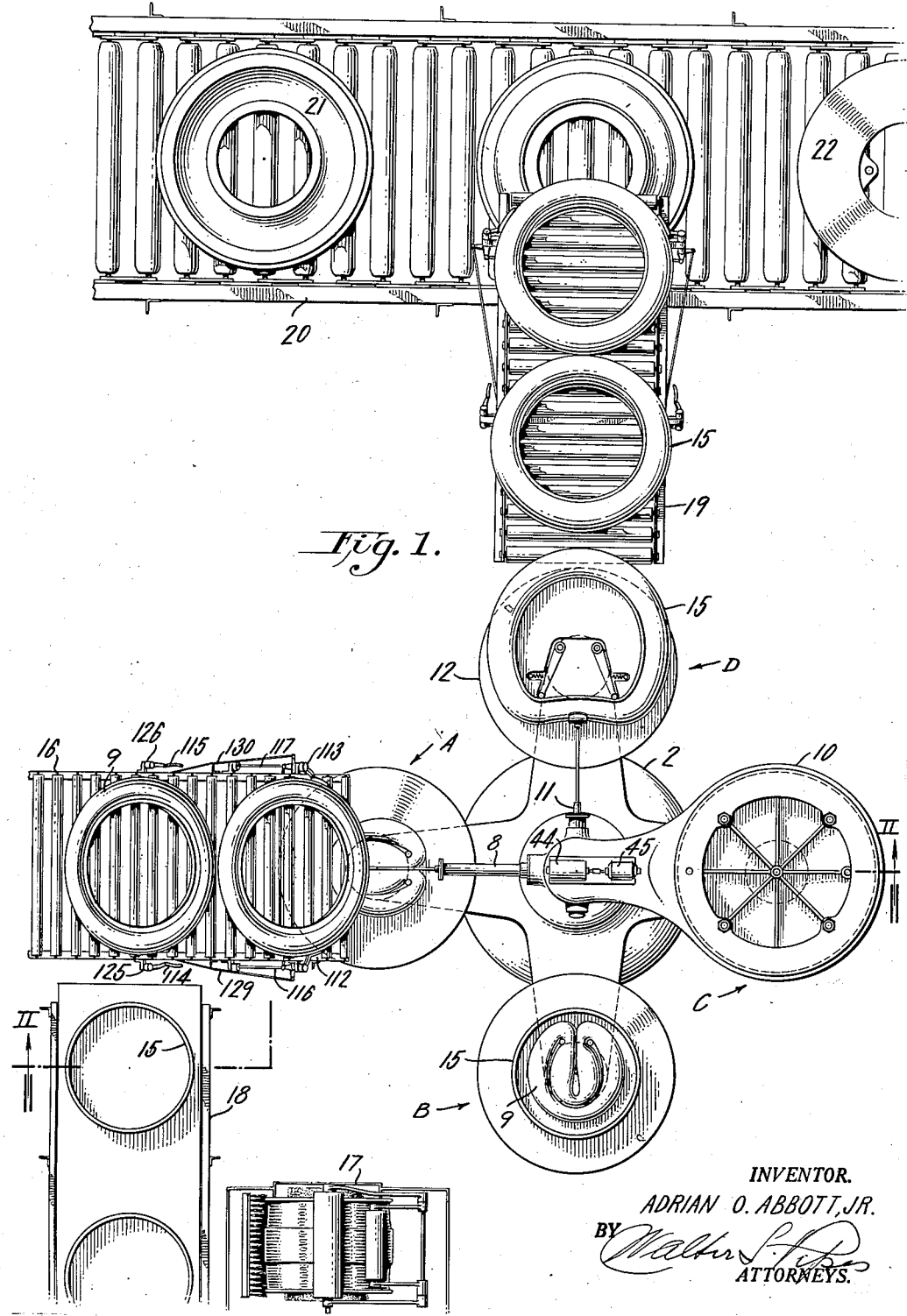
Figure 6:
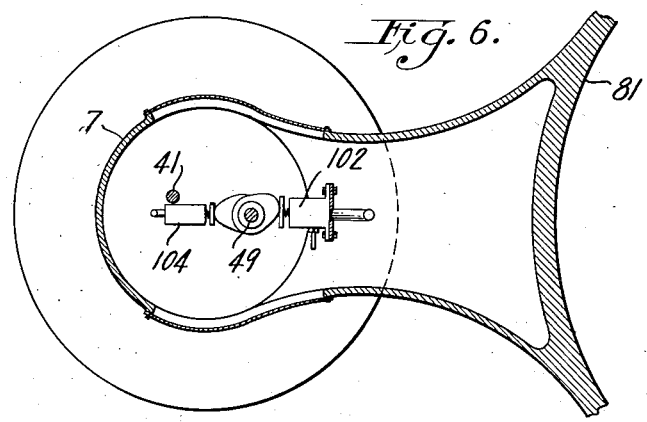
Figure 6 is a section thru the turret on line VI—VI of Fig. 2 illustrating the cam and valve mechanism.

Referring to the drawings, a turret 1, comprises a base 2 on which there is mounted a hub 4 having a plurality of arms 5, each of which terminates in a vertically extending cylinder 6. A stationary tower 7 is secured to the base 2 and extends through the hub 4. The tower 7 supports a mechanism 8 for collapsing curing bags 9, a mechanism 10 for shaping tire bands, and an ejecting mechanism 11. The several mechanisms 8, 10 and 11 are held stationary while the several arms 5 are moved successively into cooperating positions with the mechanisms. The number of the arms 5 may be varied, although I have illustrated four of them in Figs. 1 and 3 secured to the hub 4. The arms are moved intermittently and the amount of angular movement of each arm during each movement is determined by the number of arms which cooperate with the mechanisms 8, 10 and 11. In the illustrated embodiment of the invention each arm is moved 90° during each of its movements. The mechanism for moving the arms is hereinafter described.

A platform or support 12 for both tire bands 15 and curing bags 9 is supported from each cylinder 6 by a piston rod 14 extending into the cylinder so that the relative elevations of the supports 12 may be varied.

For illustrative purposes, the several stations at which operations take place have been labeled A, B, C and D. At station A, the curing bags 9 are released from the conveyor 16, one at a time, and permitted to drop into position upon a platform 12, where each bag is collapsed by the mechanism 8.

At station B, an operator removes a tire band 15 from the painting and dusting machine 17 and places the band around the collapsed bag 9. This painting and dusting machine may be of the type disclosed in my prior Patent No. 1,756,529 granted April 29, 1930.

The tire bands are supplied to this operator by the conveyor 18, the operator removing the band from conveyor and inserting it in the machine 17.

At station C, the platform 12 raises the band 15 to a position in which it is expanded to a curved shape by the mechanism 10 and in which position the collapsed bag 9 is released within the band.

At station D, the assembled band and bag is ejected from each support or platform 12 by the mechanism 11. A runoff conveyor 19 is disposed in position to receive the ejected band and bag and to convey them to a conveyor 20 on which mold sections 21 may be carried. When each tire band and bag has been placed in a lower mold section 21, the mold is completed by the application of an upper mold section 22 which may be brought into reach of an operator by an overhead conveyor (not shown).

The several operations are performed automatically by mechanism hereinafter described, which includes a motor and a plurality of cam operated valves, so that the only operations performed by operators are the placing of the tire bands 15 in the painting and dusting machine 17, the removing of the bands from this machine and the placing of them around the collapsed bags 9, and the closing of the molds on the conveyor 20.

*Turret operating mechanism*

Referring particularly to Figs. 2, 7, 8 and 9 the hub 4 is rotated about the tower 7 on roller bearings 25, by a gear 26 carried by the hub, the gear meshing with a gear 27 carried on a shaft 28 extending upwardly within the tower. The tower 7 is secured to the base 2 by a projecting lug 29 seated in a socket 30 in the base 2. The projecting lug 29 is held against rotation in the socket 30, as by a pin 31. The hub 4 at its upper edge bears against a flange 32 on the tower 7 so that the hub 4 is free to rotate about the projecting lug 29 as a center while the tower 7 is held in an upright rigid position.

Figure 9:
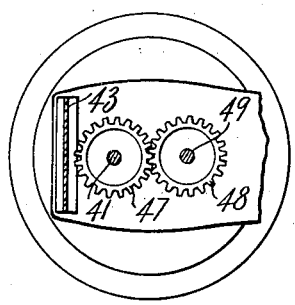
Figure 9 is a section of the machine along the line IX—IX of Fig. 2, illustrating the cam shaft gear drive.
Figure 7:
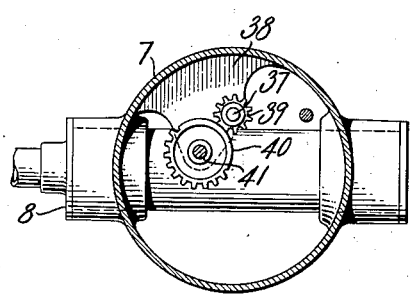
Figure 7 is a section thru the turret on line VII—VII of Fig. 2 illustrating the intermittent gears.
Figure 8:
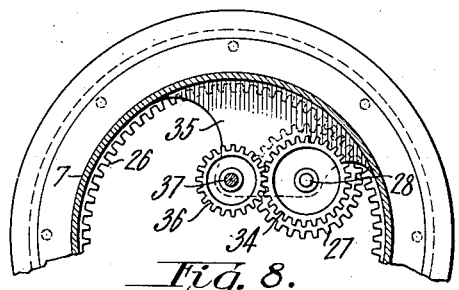
Figure 8 is a section thru the turret on line VIII—VIII of Fig. 2 illustrating the driving gear system.

Driving movement is imparted to the shaft 28 by a gear 34 mounted at the upper end of the shaft. The upper and lower ends of the shaft 28 run in bearings carried by upper and lower brackets 35 extending from the tower 7. The gear 34 meshes with a gear 36 mounted on a shaft 37 extending upwardly through a bearing carried by a bracket 38, as illustrated in Fig. 8. An intermittent gear 39 is mounted upon the upper end of shaft 37 and meshes with an intermittent gear 40 mounted on a shaft 41, as illustrated in Fig. 7. The shaft 41 extends through a bushing 42 in the tower 7 and into a housing 44 for a reducing gear. A motor 45 is connected to the gearing within the housing 44 by a shaft 46. The housing and motor are mounted upon any suitable framework 43. The motor runs continuously for rotating the shaft 41. Near the upper end of the shaft 41 a gear 47 is mounted. The gear 47 meshes with gear 48 mounted at the upper end of the cam shaft 49, as illustrated in Fig. 9. The cam shaft 49 extends thru a bushing in the tower 7 and is supported at its lower end by a bearing carried by a bracket 50.

The continuous rotation of the shaft 41 by the motor 45, continuously drives the gear 40, but the cooperating gear 39 is rotated intermittently by an amount determined by the design of the gears 39 and 40. The rotation of the gear 39 is transmitted to the hub 4 for simultaneously rotating the arms 5 by a predetermined angular movement. I have illustrated the movement as being 90° upon each actuation, although it is to be understood that the exact amount of the rotation upon each actuation may be varied as desired and in accordance with the number of arms 5 cooperating with the mechanisms 8, 10 and 11.

*Bag collapsing mechanism*

Referring particularly to Figs. 1 to 5, a curing bag 9 is shown by dotted lines in normal relaxed condition as supplied to the platform 12 at station A from the conveyor 16. The bag collapsing mechanism 8 is used for collapsing or folding the bag 9 into the shape shown in full lines.

The bag collapsing mechanism 8 comprises a piston 52 operating in telescoping cylinders 53 and 54. The free end of the piston 52 carries a hinged lug 51 which pushes the bag 9 into the folded shape illustrated. The push exerted on the bag 9 by the lug 51 is resisted by stops or retaining shoes 55 and 56 preferably carried by the bracket 58 which supports the discharge end of the conveyor 16. The stop 55 is resiliently hinged as at 57 in the direction of movement of the platforms 12 so as not to interfere with the movement of the platforms 12 after the bags have been collapsed.

For projecting the piston 52 a pipe line 61 is connected to the back end of the outer fixed cylinder 54, while for withdrawing the piston, a pipe line 62, having a flexible branch 63 and a branch 64, is provided. The flexible branch 63 is connected to the front end of the inner movable cylinder 53, while the branch 64 is connected to the front end of the outer fixed cylinder 54. Upon the admission of fluid pressure to the pipe line 61, the cylinder 53 is expanded and the piston rod 52 thrust forward so that the hinged lug 51 engages the outer periphery of the bag as described. Upon the admission of fluid pressure to the pipe line 62, the piston rod 52 and cylinder 53 are withdrawn, the lug 51 riding over the folded bag due to its hinged connection with the piston rod 52. The admission of fluid pressure to the pipe lines 61 and 62 is controlled by a valve 100.

In order to retain the bag 9 in its collapsed form upon the withdrawal of the lug 51, and also to assist in collapsing the bag, a pair of movable upright posts 65 are provided on the platform 12. The posts 65 are mounted at ends of levers 66 which are keyed to pins 67. The pins 67 extend through fluid tight joints to beneath the platform where segmental pinions 68 are mounted on the pins 67. A rack 69 is mounted for sliding movement in guides 70, beneath the platform 12.

The rack 69 has teeth meshing with the segmental pinions 68 for rotating the pins 67 and thereby moving the posts 65 towards each other. The posts 65 are normally urged and kept apart by the springs 71 which are connected to the levers 66. The springs 71 and levers 66 are mounted in a recess 72 formed in the top of the platform 12 so that there are no projections other than the posts 65, to interfere with the collapsing of the bag 9.

To move the posts 65 towards each other, the rack 69 is thrust to the left, as viewed in Fig. 2, by a piston rod 73 operating in cylinder 74. A pipe line 75 is connected to the back end of cylinder 74, while a pipe line 76 is connected to the front end. Upon the admission of fluid pressure to the pipe line 75, the piston rod 73, which is aligned with the rack 69, thrusts the rack 69 to the left, thereby moving the posts 65 towards each other. When the rack 69 moves to the left, a cam surface on the latch 77 carried by the rack 69, rides over a cam surface on a latch 78 which is mounted on a depressible spring within a bracket 79 carried by each cylinder 6. After the latch 77 rides over the latch 78, they engage to retain the posts 65 against the action of the springs 71. The piston rod 73 may now be withdrawn by the admission of fluid pressure to the pipe line 76. The admission of fluid pressure to the pipe lines 75 and 76 is controlled by a valve 101.

*Tire shaping mechanism*

The tire shaping mechanism 10 located at station C is particularly illustrated in Fig. 2 and comprises a housing 80 supported by a bracket 81 on the tower 7. The housing 80 has an inner wall 82 and an outer wall 83 forming an annular chamber in which an annular band 84 is slidable as a piston. The bottom of the housing 80 is closed by a casting 85 which is supported by the inner wall 82. The annular piston 84 has a snug sliding fit with the outer edge of the casting 85. The casting 85 affords a substantially flat surface for engagement with the upper edge of each tire band 15. The lower edge of the piston 84 is provided with a ring 86 of soft rubber for engaging the upper surfaces of the several supports 12 outside of the bands 15 so that the latter are enclosed in a substantially fluid tight chamber between the upper surface of the support 12, the bottom of the casting 85 and the inner surface of the piston 84. Fluid is admitted to each cylinder 6 to raise the cooperating support 12 when it is in registry with the shaping device 10, as hereinafter described.

Downward movement of the piston 84 is controlled by a pipe line 87 connected to a valve 102. Upward movement is controlled by a pipe line 88 connected to the same valve.

As soon as the support 12 has moved upwardly far enough to engage the lowered rubber ring 86 on the piston 84 for forming a substantially liquid tight chamber, vacuum is applied in the chamber outside of the tire band 15 through a pipe line 89 which is controlled by a valve 103. At about the time the support 12 reaches the ring 86 on the piston 84, the latches 77 and 78 have disengaged, which allows the springs 71 to actuate the posts 65 away from each other, thereby releasing the bag 9 within the pulley band 15. Continuous upward movement of the support 12 coupled with the expanding action of the vacuum applied externally of the tire band and the expansive action of the curing bag 9 within the tire causes the band to bulge outwardly to transfer it into the tire shape while the curing bag further adjusts itself to its annular form within the expanding pulley band.

When the tire has reached substantially its limit of expansion by vacuum, air under pressure is admitted to the interior of the tire through pipe 90 by the operation of a valve 104. The fluid under pressure adds a force which expands the tire a little more so that the bag 9 freely adjusts itself to proper assembly with the tire casing. It will be understood that the differential in pressure between the outer surfaces of the band acts to expand the tire relatively more in proportion to the dimensions of the bag than would be the case if only super-atmospheric pressure were admitted to the interior of the tire casing. Also, the mechanical effect of expanding the tire by vacuum and allowing pressure to develop within the tire, as above outlined, makes the expanding units self-contained, so that the pressure between the platform 12 and the casting 85 is counteracted thereby eliminating the need for increasing the pressure within the cylinder 6 more than the pressure just necessary to carry the tire into contact with the expanding device. If pressure were developed within the tire alone, a counteracting pressure would have to be developed in cylinder 6 with the consequent stress upon the frame of the machine itself and the arms and piston rods carrying the several supports 12.

Upon completion of the shaping of the tire the valve boxes are set in operation so that the vacuum line 89 is closed; fluid pressure to the interior of the tire through the pipe line 90 is turned off; the piston 84 is elevated and the support 12 is lowered carrying with it the assembled tire casing and bag. When the support 12 has substantially completed its lowering motion, the turret is operated to move it from the position C to the position D.

*Discharge mechanism*

At station D the assembled tire and bag is discharged onto the take-off conveyor 19. This is accomplished by actuating the piston in cylinder 6 which raises the support 12. When thus elevated, the tire aligns with a shoe 91 carried on a piston rod 92 extending into a cylinder 93 constituting the mechanism 11. The cylinder 93 is controlled by pipe lines 94 and 95 leading to a valve 105. Admission of fluid through the pipe line causes the piston rod 92 to be projected outwardly and to engage the tire. At the same time the support 12 begins to travel downward. The shoe 91 retains the tire in part in the elevated position permitting it to tip with the lowering of the support 12 so as to allow the posts 65 to be withdrawn from the tire. As soon as the posts are freed, the piston rod 92 in continuing its travel outwardly shoves the tire off from the support 12 and onto the inclined conveyor 19. Fluid is then admitted to the cylinder 93 through the pipe line 95 for withdrawing the piston rod 92 and shoe 91.

The tire runs down the conveyor 19 to the conveyor 20 where it is placed in a mold section 21, and a complementary mold section 22 is placed thereover. They are then carried by the conveyor 20 to a suitable vulcanizing or curing mechanism not shown.

Accordingly, with each revolution of the turret 1, four tire bands are shaped with curing bags inserted therein.

*Control of cylinders 6*

Figures 10, 11:
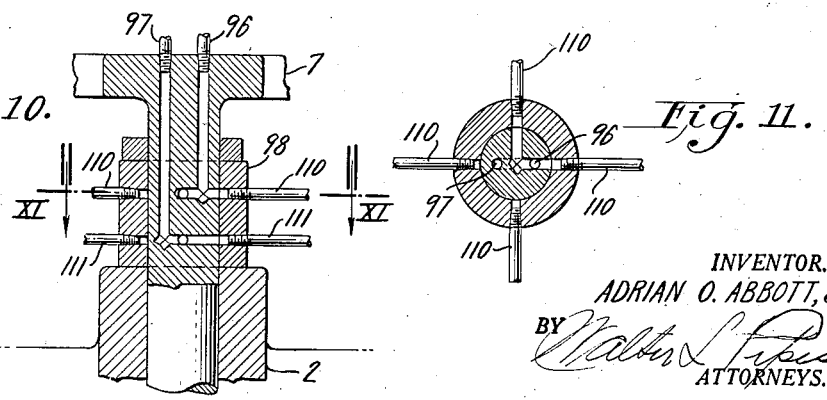
Figure 10 is an enlarged vertical section of the valve ports in the turret base shown in Fig. 2.
Figure 11 is a section along the line XI—XI of Fig. 10.

The several cylinders 6 are under the control of valve 106 which is connected to pipe lines 96 and 97 extending downwardly into the lug 29 at the base of the turret. As shown by Figs. 2, 10 and 11 each of the pipe lines 96 and 97 terminates at two ports opening toward stations C and D. A rotatable valve collar 98 surrounds the terminating ports of pipe lines 96 and 97 in lug 29. The collar 98 is ported to receive pipe lines 110 and 111 leading from each cylinder 6. The terminating ports of pipe lines 96 and 97 are so arranged that they are only in communication with the pipe lines 110 and 111 at stations C and D. The pipe line 111 is connected at the bottom of a cylinder 6 while the pipe line 110 is connected at the top of a cylinder 6. Thus, upon the admission of fluid pressure to the pipe line 97, the platforms 12 at stations C and D are raised; while upon the admission of fluid pressure to pipe line 96, the same two platforms are lowered.

Valve operating mechanism

The several valves 100, 101, 102, 103, 104 and 105 and 106 are actuated by the cam shaft 49 which is rotated continuously by the meshing gears 47 and 48, the reduction gearing 44, and the motor 45 as previously described. The several valves, except valve 103, are connected to a source of fluid under pressure not shown, while the valve 103 is connected to a vacuum pump not shown. Accordingly, as the cam shaft 49 rotates, the several valves are automatically actuated in synchronism with the intermittent movement of the hub 4 for causing the automatic collapsing of the bags 9, automatically supplied to the platform 12 by mechanism hereinafter described, and for causing the feeding of the bags to the tire bands 15, the shaping of the tire bands, and the discharge of the shaped bands and enclosed bags to the conveyors 19 and 20.

Bag supplying mechanism

Referring to Figs. 1 to 5, inclusive, the mechanism for supplying curing bags 9 to a platform or support 12 at station A comprises a gravity conveyor 16, and bag engaging members 112, 113, 114 and 115 located adjacent a point of discharge from the conveyor 16. The bag engaging members 112, and 113 are mounted in front of the members 114 and 115, respectively. When the members 112 and 113 are in bag retaining position, the members 114 and 115 are in bag releasing position. Since it is desired to supply only one bag 9 at a time to the platform 12, the rear bag engaging members 114 and 115 are spaced from the front members 112 and 113 a distance substantially equal to the outer diameter of a bag 9.

The front pair of bag engaging members 112 and 113 are fixed to shafts 116 and 117, respectively, which are suitably mounted adjacent the conveyor 16. A rearwardly extending crank arm 118, and a laterally extending crank arm 119, are fixed to the shaft 116; while similar crank arms 120 and 121 are fixed to the shaft 117. A suitable linkage 122 connects the crank arms 118 and 120 for rotating, pivoting, or oscillating the shaft 117 in a direction opposite to which the shaft 116 is rotated, pivoted, or oscillated. A lever 123 is fixed to the shaft 116 for rotating or oscillating it.

The rear pair of bag engaging members 114 and 115 are fixed to shafts or pins 125 and 126, respectively, which are suitably mounted adjacent the conveyor 16. A laterally extending crank arm 127 is fixed to the shaft 125; while a similar crank arm 128 is fixed to the shaft 126. The crank arms 127 and 128 extend in opposite directions not only with respect to each other, but also with respect to the cooperating oppositely extending crank arms 119 and 121. A link 129 connects the oppositely extending crank arms 119 and 127, while a link 130 connects the similar crank arms 121 and 128. Thus, when the shaft 116 is rotated in one direction to move the bag engaging members 112 and 113 away from each other to release a bag 9, the other bag-engaging members 114 and 115 are being moved toward each other to retain the adjacent bag.

The front bag engaging members 112 and 113 are normally held in bag retaining position by the action of a spring 124 upon the lever 123. This also causes the rear bag engaging members 114 and 115 to remain in releasing position. Therefore, to release a bag 9 from the conveyor 16, a lug 131 on the support 12 engages with a lever 123 as the support 12 moves into position at station A. This engagement of the lever 123 by the moving lug 131, moves the lever 123 against the action of the spring 124 and rotates the shaft 116 in a direction which, by the particular linkage employed, will move the front members 112 and 113 into bag releasing position while simultaneously moving the rear members 114 and 115 into bag retaining position. After the first bag 9 has been thus released by the front members 112 and 113, and automatically supplied to the platform 12 by the movement of the platform, the bag is collapsed and locked in collapsed shape on the platform as hereinbefore described. As this platform moves on to the next station, the lug 131 is disengaged from the lever 123, and the bag 9 pushes the resiliently hinged retaining shoe 56 out of the way. The spring 124, by acting on the lever 123, then rotates the shaft 116 in the opposite direction in which it was rotated by the engagement of the lug 131 with the lever 123, which moves the rear members to bag releasing position and the front members 114 and 115 to bag retaining position, thereby bringing a second bag into position to be supplied to the support 12.

While I have shown and described a present preferred embodiment of my invention, it is to be understood that it may be otherwise embodied within the spirit of the invention and the scope of the appended claims.

Having thus described my invention what I claim and desire to protect by Letters Patent is:

1. The combination with a tire shaping machine comprising means for collapsing a curing bag and releasing the collapsed bag within a tire casing, of means for automatically depositing a curing bag on the collapsing means.

2. The combination with a tire shaping machine comprising means for collapsing a curing bag and releasing the collapsed bag within a tire casing, of feeding means for automatically supplying a curing bag to the collapsing means.

3. The combination with a tire shaping machine comprising means for collapsing a curing bag and releasing the collapsed bag within a tire casing, of a conveyor for automatically supplying a curing bag to the collapsing means.

4. The combination with a tire shaping machine comprising means for collapsing a curing bag and releasing the collapsed bag within a tire casing, of gravity operable means for automatically supplying a curing bag to the collapsing means.

5. The combination with a tire shaping machine comprising means for collapsing a curing bag and releasing the collapsed bag within a tire casing, of an inclined conveyor, and means for insuring the release of but a single bag at a time for automatically supplying a curing bag to the collapsing means.

6. The combination with a tire shaping machine comprising movable means for supporting and collapsing a curing bag and releasing the collapsed bag within a tire casing, of a source for curing bags, and means responsive to the movement of said supporting means for controlling the transfer of curing bags from said source to the supporting and collapsing means.

7. In a tire shaping machine, a movable support for a curing bag, means for collapsing and clamping a curing bag on said support and including a latch element, means effective in one position of the support for actuating said collapsing means to collapse a curing bag, movable carrying means for said support and comprising a second latch element engaging the first latch element for restraining the collapsing means, and means for moving said support relatively to said carrying means for releasing the latch elements.

8. In a tire shaping machine, a movable support for a curing bag, means for collapsing and clamping a curing bag on said support and including a latch element, means effective in one position of the support for actuating the collapsing and clamping means, a moving arm supporting a cylinder and having a cooperating latch element for retaining the collapsing and clamping means, and a piston and piston rod operating in said cylinder and carrying said support, whereby the admission of fluid under pressure to said cylinder causes relative movement between said support and arm to release the latch elements.

9. In a tire shaping machine, a support for a curing bag, said support forming a wall of a chamber for application of differential pressure to a tire band during a shaping operation, cooperating means for completing the chamber, movable curing bag confining means on said support and operable in said chamber, actuating means for said confining means external to said chamber, and connecting means between the actuating and confining means and having a substantially fluid tight connection with said support, whereby said confining means may be operating without affecting the pressure conditions in said chamber.

10. In a tire shaping machine, a support for a curing bag, said support forming a wall of a chamber for application of differential pressure to a tire band during a shaping operation, cooperating means for completing the chamber, shafts extending thru said support with a substantially fluid tight fit, means attached to said shafts and operable within said chamber for releasably clamping a curing bag, and actuating means connected to said shafts exteriorly of said chamber.

11. In a tire shaping machine, a movable support for a curing bag, means for supplying curing bags to said support, and means for releasing the bags successively from said supplying means to said support, said releasing means being actuated by the movement of said support.

12. A tire shaping machine comprising in combination, a conveyor for tire forming elements, supports for said elements successively movable into a position adjacent a point of discharge from the conveyor, and means for releasing an element from the conveyor onto the support as the support moves into said position.

13. A tire shaping machine comprising in combination, means for collapsing a curing bag, means for releasing the collapsed bag within a pulley band placed around the bag and for expanding the band, means for removing the expanded band, and means for supplying curing bags one at a time to said collapsing means, each of said means being synchronized for successive action.

14. A tire shaping machine comprising in combination, a plurality of supports for curing bags, means for positioning curing bags one at a time on said supports, means for collapsing the curing bags, means for releasing the said curing bags within pulley bands placed around the bags and for expanding the bands, and means for removing the expanded bands from the supports, each of said means being synchronized for successive action.

15. A tire shaping machine comprising in combination, a plurality of supports for curing bags, means for positioning curing bags one at a time on said supports, means for collapsing the curing bags, means for releasing the said curing bags within pulley bands placed around the bags and expanding the bands, and means for removing the expanded bands from the supports, means for moving each of said supports successively into operative positions adjacent the said means, and each of said means being synchronized for successive action.

16. In a tire forming machine, the combination with a curing bag support, of means for supplying curing bags one at a time to said support, said means comprising a conveyor, bag engaging means for successively retaining on and releasing adjacent curing bags from the conveyor to the support, an actuating member for said bag engaging means, said member being actuated by direct engagement with said support for releasing a bag.

17. In a tire forming machine, the combination with a curing bag support, of means for supplying curing bags one at a time to said support, said means comprising a conveyor, spaced bag engaging members pivotally mounted adjacent the conveyor for alternately retaining and releasing the bags one at a time, crank arms projecting from opposite sides of said members, means for connecting said arms, said crank arms and connecting means permitting motion of said members in opposite directions about their pivots, an actuating member for said bag engaging members, said member being actuated by direct engagement with said support for releasing a bag.

18. In a tire forming machine, the combination with a curing bag support, of means for supplying curing bags to said support, said means comprising a conveyor, spaced pairs of spaced bag engaging members pivotally mounted adjacent the conveyor for alternately retaining on and releasing the bags from the conveyor singly, crank arms projecting from opposite sides of each pair of spaced bag engaging members, links connecting said arms, additional crank arms projecting from one of said pairs of spaced bag engaging members, means for connecting said additional crank arms; all of said crank arms, links and connecting means imparting motion to the bag engaging members of each pair in opposite directions about their pivots and means for actuating said bag engaging members.

19. In a tire forming machine, the combination with a curing bag support, of means for supplying curing bags to said support, said means comprising a conveyor, spaced pairs of spaced bag engaging members pivotally mounted adjacent the conveyor for alternately retaining on and releasing the bags from the conveyor singly, crank arms projecting from opposite sides of each pair of spaced bag engaging members, links connecting said arms, additional crank arms projecting from one of said pairs of spaced bag engaging members, means for connecting said additional crank arms; all of said crank arms, links and connecting means imparting motion to the bag engaging members of each pair in opposite directions about their pivots and means for actuating said bag engaging members, said means comprising a pair of shafts to which the respective bag engaging members and crank arms of one of said pairs is keyed, a lever fixed to said shaft for rotating it in one direction by direct engagement of the lever with said support for releasing a bag, and means for rotating the shaft in the other direction for retaining an adjacent bag.

20. In a tire forming machine, the combination with a curing bag support, of means for supplying curing bags to said support, said means comprising a conveyor, spaced pairs of spaced bag engaging members pivotally mounted adjacent the conveyor for alternately retaining and releasing the bags from the conveyor singly, crank arms projecting from opposite sides of each pair of spaced bag engaging members, links connecting said arms, additional crank arms projecting from one of said pairs of spaced bag engaging members, means for connecting said additional crank arms, all of said crank arms, links and connecting means imparting motion to the bag engaging members of each pair in opposite directions about their pivots, and means for actuating said bag engaging members, said means comprising a pair of shafts to which the respective bag engaging members and crank arms of one of said pairs is fixed, and means for oscillating said shafts, whereby when either pair of bag engaging members is in retaining position, the other pair is in releasing position.

ADRIAN O. ABBOTT, Jr.